United States Patent
Kim et al.

(10) Patent No.: US 11,214,116 B2
(45) Date of Patent: Jan. 4, 2022

(54) INTEGRATED HEAT MANAGEMENT SYSTEM FOR VEHICLE

(71) Applicant: Hanon Systems, Daejeon (KR)

(72) Inventors: Chul Hee Kim, Daejeon (KR); Doo Hoon Kim, Daejeon (KR); Hyeon Gyu Kim, Daejeon (KR); Joong Man Han, Daejeon (KR)

(73) Assignee: Hanon Systems, Daejeon (KR)

(*) Notice: Subject to any disclaimer, the term of this patent is extended or adjusted under 35 U.S.C. 154(b) by 144 days.

(21) Appl. No.: 16/645,844

(22) PCT Filed: Sep. 13, 2018

(86) PCT No.: PCT/KR2018/010782
§ 371 (c)(1),
(2) Date: Mar. 10, 2020

(87) PCT Pub. No.: WO2019/066330
PCT Pub. Date: Apr. 4, 2019

(65) Prior Publication Data
US 2020/0276879 A1    Sep. 3, 2020

(30) Foreign Application Priority Data
Sep. 27, 2017  (KR) .................. 10-2017-0124903

(51) Int. Cl.
*B60H 1/00* (2006.01)
*B60L 58/26* (2019.01)
*B60H 1/14* (2006.01)

(52) U.S. Cl.
CPC ..... *B60H 1/00278* (2013.01); *B60H 1/00342* (2013.01); *B60H 1/00385* (2013.01);
(Continued)

(58) Field of Classification Search
CPC  B60H 1/00278; B60H 1/143; B60H 1/00342; B60H 1/00385; B60H 1/00485;
(Continued)

(56) References Cited

U.S. PATENT DOCUMENTS 5,878,589 A *  3/1999  Tanaka ............... B60H 1/00007
                                                62/199
6,347,528 B1 *  2/2002  Iritani .................. B60L 3/0046
                                                62/324.6
(Continued)

FOREIGN PATENT DOCUMENTS

KR  20120091772 A  8/2012
KR  20120133737 A  12/2012
(Continued)

OTHER PUBLICATIONS

International Search Report issued in PCT/KR2018/010782 dated Jan. 2, 2019.

*Primary Examiner* — Ljiljana V. Ciric
(74) *Attorney, Agent, or Firm* — Norton Rose Fulbright US LLP; James R. Crawford (57) ABSTRACT

An integrated heat management system for a vehicle includes a refrigerant circulation line configured to cool or heat a passenger compartment while operating in an air conditioner mode or a heat pump mode according to a flow direction of a refrigerant, an electric component module side cooling water circulation line configured to circulate the cooling water through the electric component module to cool the electric component module, a water-cooled outdoor heat exchanger configured to allow the refrigerant circulating through the refrigerant circulation line to exchange heat with the cooling water circulating through the electric component module side cooling water circulation line, and a cooling water flow control unit configured to control a
(Continued)

cooling water flow in the electric component module side cooling water circulation line.

14 Claims, 6 Drawing Sheets

(52) U.S. Cl.
CPC ..... *B60H 1/00485* (2013.01); *B60H 1/00885* (2013.01); *B60H 1/00899* (2013.01); *B60H 1/143* (2013.01); *B60L 58/26* (2019.02); *B60H 2001/00307* (2013.01); *B60H 2001/00935* (2013.01)

(58) Field of Classification Search
CPC ............ B60H 1/00885; B60H 1/00899; B60H 2001/00935; B60H 2001/00307; B60H 2001/00928; B60H 1/00907; B60H 2001/00949; B60H 1/00921; B60L 58/26; B60L 1/02; B60Y 2200/90; H01M 10/613; H01M 10/667; H01M 10/6568; H01M 10/663; H01M 2220/20; H01M 10/625; Y02E 60/10; Y02T 10/70
USPC .................................................... 62/159, 160
See application file for complete search history.

(56) References Cited

U.S. PATENT DOCUMENTS

| | | | | |
|---|---|---|---|---|
| 6,769,481 B2* | 8/2004 | Yoshimura | ................ | F24F 1/44 165/240 |
| 7,240,504 B2* | 7/2007 | Cho | ........................ | F25B 13/00 62/238.7 |
| 7,240,505 B2* | 7/2007 | Kim | ........................ | F25B 27/02 62/238.7 |
| 7,481,071 B2* | 1/2009 | Choi | ........................ | F25B 27/02 62/238.7 |
| 9,180,754 B2* | 11/2015 | Wang | ................ | B60H 1/00921 |
| 9,539,880 B2* | 1/2017 | Inaba | ................ | B60H 1/00899 |
| 9,573,437 B2* | 2/2017 | Osaka | ................ | B60H 1/0005 |
| 9,649,909 B2* | 5/2017 | Enomoto | ............. | B60W 20/00 |
| 9,651,267 B2* | 5/2017 | Tamaki | ................ | F25B 29/003 |
| 10,173,491 B2* | 1/2019 | Kim | ........................ | B60H 1/00278 |
| 10,183,544 B2* | 1/2019 | Kim | ........................ | F25B 25/005 |
| 10,183,549 B2* | 1/2019 | Koberstein | ........ | B60H 1/32284 |
| 10,252,597 B2* | 4/2019 | Wallace | ................ | B60L 58/24 |
| 10,252,599 B2* | 4/2019 | Kim | ................ | B60H 1/00385 |
| 10,343,483 B2* | 7/2019 | Kim | ................ | B60H 1/00278 |
| 10,717,337 B2* | 7/2020 | Kim | ................ | H01M 10/625 |
| 10,752,092 B2* | 8/2020 | Choi | .................... | B60H 1/3213 |
| 2002/0050351 A1* | 5/2002 | Yoshimura | ................ | F24F 1/06 165/240 |
| 2006/0037344 A1* | 2/2006 | Cho | .......................... | F02G 5/02 62/323.1 |
| 2006/0123820 A1* | 6/2006 | Kim | ........................ | F25B 13/00 62/238.7 |
| 2013/0299129 A1* | 11/2013 | Osaka | .................. | B60H 1/0005 165/59 |
| 2015/0128628 A1* | 5/2015 | Kawagoe | ................ | F25B 41/26 62/160 |
| 2015/0273976 A1* | 10/2015 | Enomoto | ............. | B60L 3/0061 165/202 |
| 2016/0001636 A1* | 1/2016 | Terada | ...................... | F25B 5/02 62/160 |
| 2016/0116192 A1* | 4/2016 | Kim | ........................ | F28F 27/00 62/115 |
| 2016/0159204 A1* | 6/2016 | Katoh | ................ | B60H 1/32284 62/185 |
| 2016/0318373 A1* | 11/2016 | Kang | ........................ | F25B 5/00 |
| 2016/0339766 A1* | 11/2016 | Choi | .................... | F25B 25/005 |
| 2017/0089617 A1* | 3/2017 | Choi | ........................ | F24H 4/00 |
| 2017/0158022 A1* | 6/2017 | Kim | ................ | B60H 1/00921 |
| 2017/0203635 A1* | 7/2017 | Kuroda | .................... | F25B 41/20 |
| 2017/0361677 A1* | 12/2017 | Kim | .................... | F25B 25/005 |
| 2017/0369080 A1* | 12/2017 | Mijin | ................ | B61D 27/0063 |
| 2018/0072130 A1* | 3/2018 | Kim | .................... | B60H 1/32281 |
| 2018/0086177 A1* | 3/2018 | Agathocleous | .... | B60H 1/00492 |
| 2018/0117985 A1* | 5/2018 | Kim | ................ | B60H 1/00921 |
| 2018/0117986 A1* | 5/2018 | Kim | ................ | B60H 1/00278 |
| 2018/0201096 A1* | 7/2018 | Tsubouchi | ......... | B60H 1/32014 |
| 2018/0312034 A1* | 11/2018 | Koberstein | ........ | B60H 1/00271 |
| 2018/0312035 A1* | 11/2018 | Koberstein | ........ | B60H 1/32284 |
| 2019/0061470 A1* | 2/2019 | Koberstein | ............ | B60H 3/024 |
| 2019/0135071 A1* | 5/2019 | Hwang | ................ | B60H 1/143 |
| 2019/0135075 A1* | 5/2019 | Hwang | .................... | B60H 1/00 |
| 2019/0210430 A1* | 7/2019 | Choi | ........................ | F25B 5/04 |
| 2019/0225050 A1* | 7/2019 | Kang | .................... | F25B 49/02 |
| 2020/0122545 A1* | 4/2020 | Lee | .................... | B60H 1/00885 |
| 2020/0132349 A1* | 4/2020 | Hong | ........................ | C21D 9/08 |
| 2020/0180391 A1* | 6/2020 | Kim | .................... | B60H 1/32284 |
| 2020/0384827 A1* | 12/2020 | Oh | ........................ | B60H 1/3208 |
| 2020/0393174 A1* | 12/2020 | Lee | ........................ | F01N 3/02 |
| 2021/0180805 A1* | 6/2021 | Jang | ........................ | F24F 1/00073 |
| 2021/0180841 A1* | 6/2021 | Chung | ...................... | F24F 1/44 |
| 2021/0190393 A1* | 6/2021 | Lee | .................... | F02M 21/0212 |

FOREIGN PATENT DOCUMENTS

| | | | |
|---|---|---|---|
| KR | 20140147365 A | | 12/2014 |
| KR | 101703604 B1 | | 2/2017 |

\* cited by examiner

INTEGRATED HEAT MANAGEMENT SYSTEM FOR VEHICLE

This application is a national phase under 35 U.S.C. § 371 of International Application No. PCT/KR2018/010782 filed Sep. 13, 2018, which claims the benefit of priority from Korean Patent Application No. 10-2017-0124903 filed on Sep. 27, 2017. The entire contents of each of these applications is incorporated herein by reference in its entirety.

TECHNICAL FIELD

The present invention relates to an integrated heat management system for a vehicle and, more particularly, to an integrated heat management system for a vehicle capable of improving the connectivity between heat management devices and the commonality of components, thereby reducing the number of components without causing a decrease in the performance of the heat management devices, and consequently reducing the manufacturing cost.

BACKGROUND ART

Examples of environmentally friendly vehicles include an electric vehicle, a hybrid vehicle and a fuel cell vehicle (hereinafter collectively referred to as "vehicle").

Figure 1:
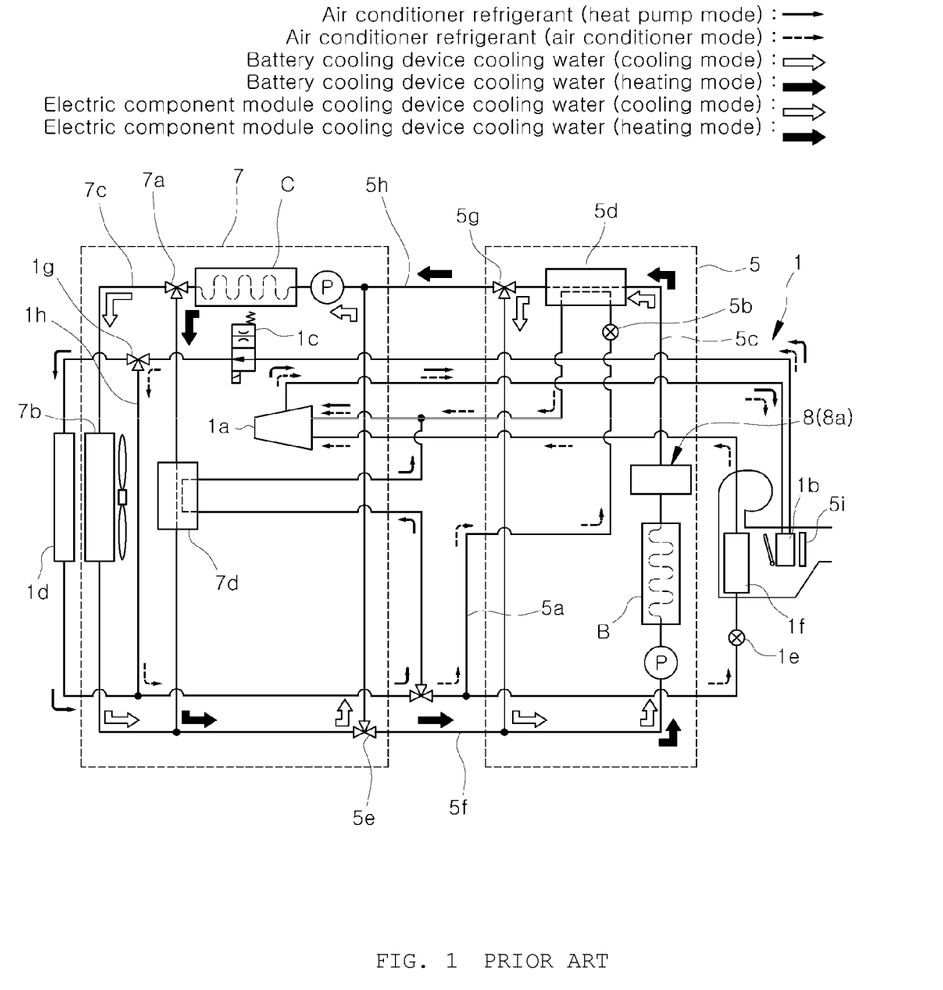
FIG. 1 is a view showing a conventional integrated heat management system for a vehicle.

Such vehicles are equipped with various heat management devices. For example, as shown in FIG. 1, the heat management device includes an air conditioner 1 for cooling and heating a passenger compartment, a water-cooled battery cooling device 5 for cooling a battery B, a water-cooled electric component module cooling device 7 for cooling an electric component module C, and the like.

The air conditioner 1 is of a heat pump type and is used for cooling or heating purposes while being controlled in a heat pump mode or an air conditioner mode depending on the flow direction of a refrigerant.

Particularly, in the heat pump mode, a refrigerant is circulated through a heat pump cycle that includes a compressor 1a, a high-pressure side indoor heat exchanger 1b, a heat pump mode expansion valve 1c and an outdoor heat exchanger 1d. Heat having high temperature is generated in the high-pressure side indoor heat exchanger 1b through the circulation of the refrigerant. A passenger compartment is heated by the heat thus generated.

In the air conditioner mode, a refrigerant is circulated through an air conditioning cycle that includes a compressor 1a, a high-pressure side indoor heat exchanger 1b, an air conditioner mode expansion valve 1e and a low-pressure side indoor heat exchanger 1f. Through such circulation of the refrigerant, low-temperature cold air is generated in the low-pressure side indoor heat exchanger 1f to cool a passenger compartment with the cold air thus generated.

In the cooling mode, the battery cooling device 5 cools the battery B using the refrigerant of the air conditioner 1.

Particularly, the refrigerant in the air conditioner 1 is bypassed through a bypass flow path 5a. The bypassed refrigerant is expanded and depressurized by the expansion valve 5b. Then, the depressurized/expanded refrigerant having low temperature and the cooling water in a cooling water circulation line 5c are caused to exchange heat in a chiller 5d to cool the cooling water. The cooled cooling water is circulated toward the battery B through the cooling water circulation line 5c, thereby cooling the battery B.

In the heating mode, the battery B is cooled by using the cooling water of the electric component module cooling device 7.

In particular, the cooling water of the electric component module cooling device 7 is introduced through a three-way valve 5e and a first connection line 5f. The introduced cooling water is circulated toward the battery B. Then, the battery B is cooled by the circulated cooling water. Subsequently, the cooling water that has cooled the battery B is returned to the electric component module cooling device 7 through a three-way valve 5g and a second connection line 5h.

In the cooling mode, the electric component module cooling device 7 controls the three-way valve 7a to connect the electric component module C and the radiator 7b, whereby the cooling water in a cooling water circulation line 7c is circulated between the radiator 7b and the electric component module C to cool the electric component module C.

In the heating mode, the three-way valve 7a is controlled to connect the electric component module C and the waste heat recovery chiller 7d, whereby the cooling water in the cooling water circulation line 7c is circulated between the waste heat recovery chiller 7d and the electric component module C to cool the electric component module C.

The cooling water introduced into the waste heat recovery chiller 7d is cooled in the waste heat recovery chiller 7d while exchanging heat with the refrigerant of the air conditioner 1. The cooling water thus cooled cools the battery B and the electric component module C while circulating through the battery B and the electric component module C.

On the other hand, the refrigerant of the air conditioner 1 heat-exchanged in the waste heat recovery chiller 7d is heated while absorbing the waste heat of the battery B and the electric component module C. The refrigerant heated in this way improves the heating performance in the passenger compartment by enhancing the efficiency of the heat pump mode of the air conditioner 1.

Referring again to FIG. 1, the heat management device further includes a battery preheater 8 for preheating the battery B when the battery B is charged.

The battery preheater 8 includes a PTC heater 8a installed on the cooling water circulation line 5c of the battery cooling device 5.

The PTC heater 8a heats the cooling water flowing through the cooling water circulation line 5c when the battery B is charged. Thus, the heated cooling water is introduced into the battery B to preheat the battery B. This improves the charging efficiency when the battery B is charged.

However, such a conventional vehicle has a disadvantage in that the number of components of each heat management device is too large, which leads to a problem that the manufacturing cost increases.

Particularly, the air conditioner 1 often suffers from an icing phenomenon in which the surface of the outdoor heat exchanger 1d freezes due to the cold air generated in the outdoor heat exchanger 1d in the heat pump mode. In order to prevent this phenomenon, it is necessary to adopt a three-way bypass valve 1g and a bypass line 1h for bypassing the refrigerant without allowing the refrigerant to pass through the outdoor heat exchanger 1d at the time of occurrence of the icing phenomenon on the surface of the outdoor heat exchanger 1d.

In addition, the conventional air conditioner 1 is configured to absorb the waste heat of the battery B and the electric component module C through the waste heat recovery chiller 7d in the heat pump mode. This leads to a drawback that the waste heat recovery chiller 7d is required to absorb the waste heat of the battery B and the electric component module C.

As a result, the conventional vehicle has a disadvantage that the number of components of the air conditioner 1 is too large, which leads to a problem that the manufacturing cost increases.

SUMMARY

In view of the aforementioned problems inherent in the related art, it is an object of the present invention to provide an integrated heat management system for a vehicle capable of significantly improving the connectivity between an air conditioner and an electric component module cooling device and the commonality of components, thereby reducing the number of components without causing a decrease in the performance of the air conditioner and the electric component module cooling device.

Another object of the present invention is to provide an integrated heat management system for a vehicle capable of significantly improving the connectivity between an air conditioner and an electric component module cooling device and the commonality of components, thereby preventing occurrence of an icing phenomenon on the surface of an outdoor heat exchanger without adopting a refrigerant bypassing structure.

A further object of the present invention is to provide an integrated heat management system for a vehicle capable of significantly improving the connectivity between an air conditioner and an electric component module cooling device and the commonality of components, thereby enabling the air conditioner to absorb waste heat of the battery and the electric component module without adopting a separate waste heat recovery chiller.

A still further object of the present invention is to provide an integrated heat management system for a vehicle capable of preventing occurrence of an icing phenomenon on the surface of an outdoor heat exchanger without adopting a refrigerant bypassing structure, enabling an air conditioner to absorb waste heat of a battery and an electric component module without adopting a waste heat recovery chiller, reducing the number of components, and consequently reducing a manufacturing cost.

According to one aspect of the present invention, there is provided an integrated heat management system for a vehicle, including: a refrigerant circulation line configured to cool or heat a passenger compartment while operating in an air conditioner mode or a heat pump mode according to a flow direction of a refrigerant; an electric component module side cooling water circulation line configured to circulate the cooling water through the electric component module to cool the electric component module, the electric component module side cooling water circulation line including a radiator for cooling the cooling water absorbing waste heat of the electric component module; a water-cooled outdoor heat exchanger configured to allow the refrigerant circulating through the refrigerant circulation line to exchange heat with the cooling water circulating through the electric component module side cooling water circulation line; and a cooling water flow control unit configured to control a cooling water flow in the electric component module side cooling water circulation line such that at least one of the cooling water absorbing the waste heat of the electric component module and the cooling water cooled by the radiator is caused to circulate through the water-cooled outdoor heat exchanger.

In the system, the refrigerant circulation line may include a compressor, a high-pressure-side indoor heat exchanger, a heat pump mode expansion valve, an air conditioner mode expansion valve and a low-pressure-side indoor heat exchanger; the refrigerant circulation line may be configured to, in a passenger compartment cooling mode, enter the air conditioner mode such that the refrigerant in the compressor passes through the air conditioner mode expansion valve to generate cold air in the low-pressure-side indoor heat exchanger on a downstream side, and in a passenger compartment heating mode, enter the heat pump mode such that the refrigerant in the compressor passes through the heat pump mode expansion valve to generate heat in the high-pressure-side indoor heat exchanger on an upstream side; the water-cooled outdoor heat exchanger may be configured to, in the passenger compartment cooling mode, allow the refrigerant having a high temperature to exchange heat with the cooling water in the electric component module side cooling water circulation line; and the water-cooled outdoor heat exchanger may be configured to, in the passenger compartment heating mode, allow the refrigerant having low temperature to exchange heat with the cooling water in the electric component module side cooling water circulation line.

In the system, the cooling water flow control unit may be configured to, in the passenger compartment cooling mode, allow the cooling water cooled by the radiator to circulate through the water-cooled outdoor heat exchanger such that the cooling water cooled by the radiator and the refrigerant having a high temperature in the refrigerant circulation line exchange heat with each other in the water-cooled outdoor heat exchanger, and in the passenger compartment heating mode, allow the cooling water absorbing the waste heat of the electric component module to circulate through the water-cooled outdoor heat exchanger such that the cooling water absorbing the waste heat of the electric component module and the refrigerant having a low temperature in the refrigerant circulation line exchange heat with each other in the water-cooled outdoor heat exchanger.

The system may further include: a battery side cooling water circulation line configured to allow the cooling water to circulate through the battery to cool the battery. The cooling water flow control unit may be configured to, in the passenger compartment heating mode, allow the cooling water in the electric component module side cooling water circulation line to circulate through the battery side cooling water circulation line to cool the battery.

With the integrated heat management system for a vehicle according to the present invention, it is possible to significantly improve the connectivity between the air conditioner and the electric component module cooling device and the commonality of components, thereby reducing the number of components without causing a decrease in the performance of the air conditioner and the electric component module cooling device.

In particular, the water-cooled outdoor heat exchanger of the air conditioner is used as a refrigerant condenser in the cooling mode, and is used as a refrigerant evaporator in the heating mode. The water-cooled outdoor heat exchanger of the air conditioner is configured to exchange heat with the electric component module cooling device in a water-cooled manner. As a result, when cold air is generated in the heating mode, the influence of the generated cold air can be alleviated by the cooling water of the electric component module cooling device. Therefore, it is possible to surely prevent the surface icing phenomenon which may be caused by the cold air.

In addition, the surface icing phenomenon in the water-cooled outdoor heat exchanger of the air conditioner is prevented by the cooling water of the electric component module cooling device. Therefore, unlike the conventional method of preventing the icing of the outdoor heat exchanger by using a separate bypass valve, it is possible to prevent occurrence of an icing phenomenon on the surface of the outdoor heat exchanger without adopting a separate bypass valve. This makes it possible to reduce the number of components and to reduce a manufacturing cost.

Furthermore, the water-cooled outdoor heat exchanger of the air conditioner also plays the role of a waste heat recovery chiller that recovers the waste heat of the electric component module cooling device in the heating mode. This enables the air conditioner to absorb the waste heat of the battery and the electric component module without adopting a separate waste heat recovery chiller, thereby reducing the number of components and consequently reducing a manufacturing cost.

Moreover, the water-cooled outdoor heat exchanger of the air conditioner is cooled while exchanging heat with the electric component module cooling device. Therefore, unlike the conventional outdoor heat exchanger having an air-cooled structure, there is no need to install the water-cooled outdoor heat exchanger of the air conditioner in parallel with the radiator.

Since the water-cooled outdoor heat exchanger of the air conditioner does not need to be installed in parallel with the radiator, it is possible to broaden the installation space of the radiator and to increase the size of the radiator, thereby increasing the cooling capacity of the radiator and significantly improving the cooling performance of the electric component module cooling device, the battery cooling device and the air conditioner.

DETAILED DESCRIPTION

Preferred embodiments of an integrated heat management system for a vehicle according to the present invention will now be described in detail with reference to the accompanying drawings.

Figure 2:
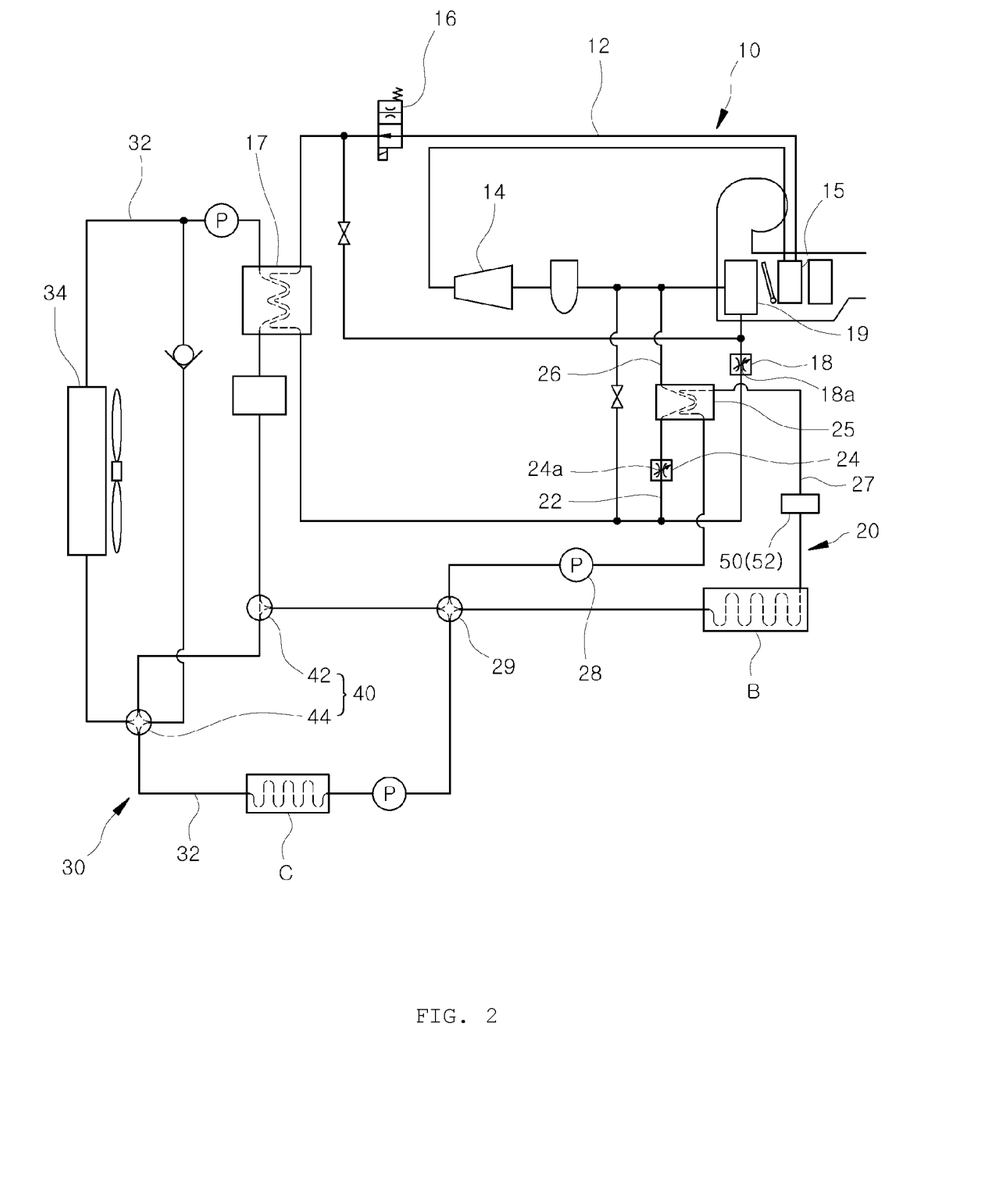
FIG. 2 is a view specifically showing a configuration of an integrated heat management system for a vehicle according to the present invention.

Referring first to FIG. 2, the integrated heat management system according to the present invention includes an air conditioner 10 for cooling and heating a passenger compartment.

The air conditioner 10 includes a refrigerant circulation line 12. The refrigerant circulation line 12 is provided with a compressor 14, a high-pressure-side indoor heat exchanger 15, a heat pump mode expansion valve 16, a water-cooled outdoor heat exchanger 17, an air conditioner mode expansion valve 18, and a low-pressure-side indoor heat exchanger 19.

Figure 3:
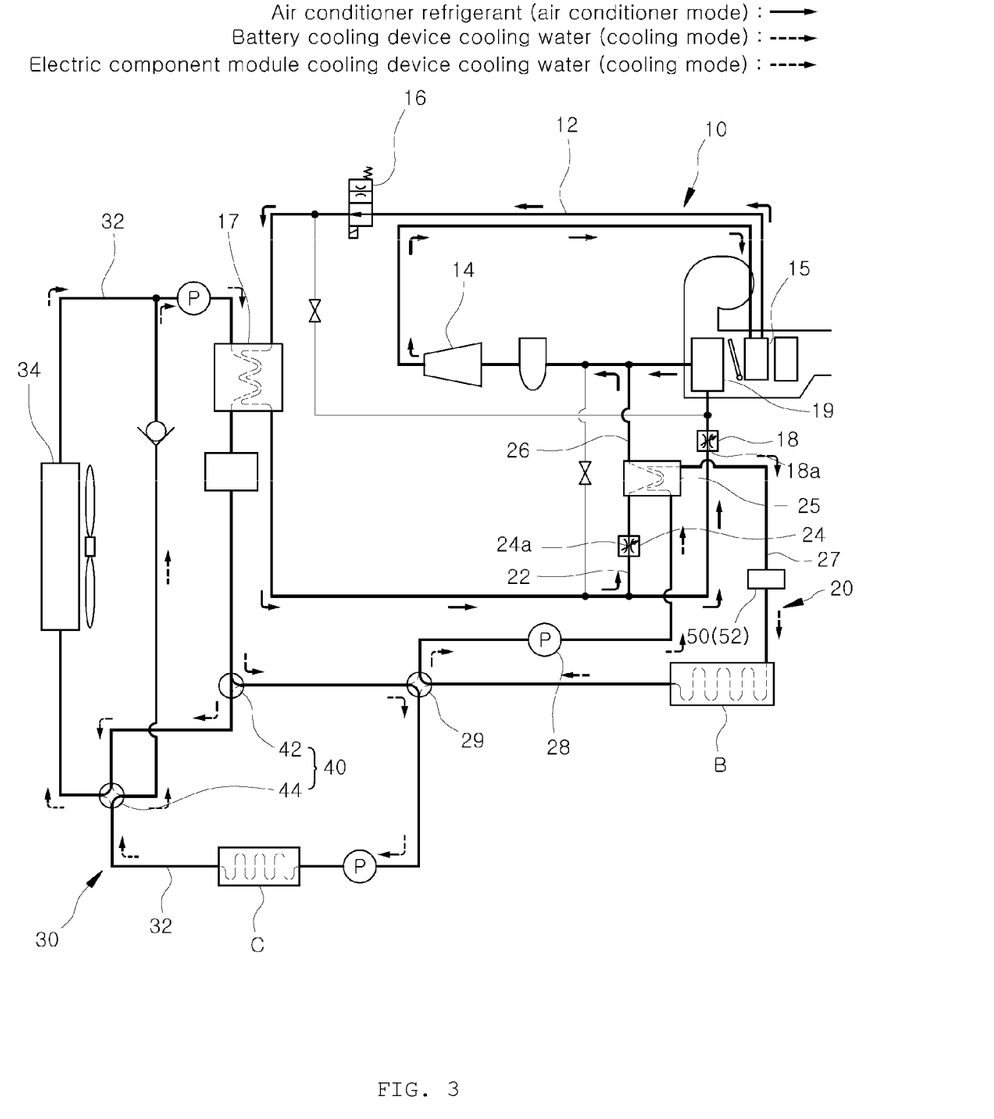
FIG. 3 is an operation view showing an operation example of the integrated heat management system according to the present invention, in which view there are shown operation examples of an air conditioner, a battery cooling device and an electric component module cooling device in a passenger compartment cooling mode.

In a passenger compartment cooling mode, as shown in FIG. 3, the refrigerant circulation line 12 is controlled in an air conditioner mode to open the heat pump mode expansion valve 16.

Therefore, the refrigerant in the refrigerant circulation line 12 may be circulated without passing through the heat pump mode expansion valve 16. Such circulation of the refrigerant generates a low-temperature cold air in the low-pressure-side indoor heat exchanger 19. The passenger compartment is cooled by the cold air thus generated.

Figure 4:
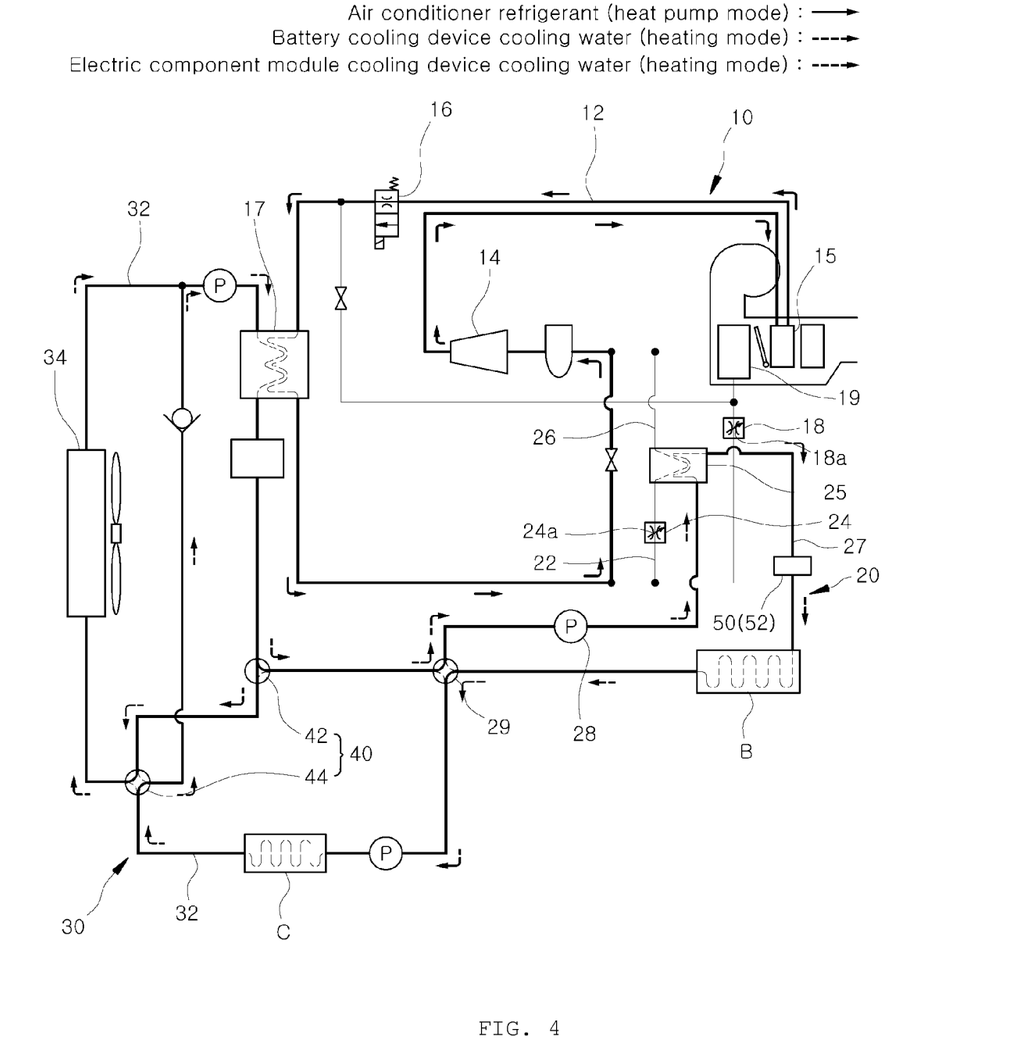
FIG. 4 is an operation view showing an operation example of the integrated heat management system according to the present invention, in which view there are shown operation examples of the air conditioner, the battery cooling device and the electric component module cooling device in a passenger compartment heating mode.

In a passenger compartment heating mode, as shown in FIG. 4, the refrigerant circulation line 12 is controlled in a heat pump mode to open the heat pump mode expansion valve 16.

Therefore, the refrigerant in the refrigerant circulation line 12 may be circulated while passing through the heat pump mode expansion valve 16. Such circulation of the refrigerant generates high-temperature heat in the high-pressure-side indoor heat exchanger 15. The passenger compartment is heated by the heat thus generated.

In a heat pump mode, a variable throttle flow path 18a of the air conditioner mode expansion valve 18 is completely shut off. Therefore, in the heat pump mode, the introduction of the refrigerant to the low-pressure-side indoor heat exchanger 19 is interrupted, and the operation of the low-pressure-side indoor heat exchanger 19 is stopped.

On the other hand, the water-cooled outdoor heat exchanger 17 serves as a condenser in the air conditioner mode, and serves as an evaporator in the heat pump mode. The water-cooled outdoor heat exchanger 17 emits high-temperature heat in the air conditioner mode, and emits low-temperature cold air in the heat pump mode.

Referring again to FIG. 2, the integrated heat management system according to the present invention further includes a water-cooled battery cooling device 20 for cooling a battery B, and a water-cooled electric component module cooling device 30 for cooling an electric component module C.

The battery cooling device 20 includes a bypass flow path 22 capable of bypassing the refrigerant on the side of the water-cooled outdoor heat exchanger 17 of the refrigerant circulation line 12 in the passenger compartment cooling mode, an expansion valve 24 for expanding and depressurizing the refrigerant in the bypass flow path 22, a chiller 25 for generating a cold air by introducing the expanded/depressurized refrigerant, a return line 26 for returning the refrigerant from the chiller 25 to the refrigerant circulation line 12, and a battery side cooling water circulation line 27 for delivering the cold air generated in the chiller 25 to the battery B.

In particular, the battery side cooling water circulation line 27 is provided with a water pump 28, and is configured to circulate cooling water between the chiller 25 and the battery B. Therefore, the cold air generated in the chiller 25 is transferred to the battery B to cool the battery B.

In the meantime, the battery side cooling water circulation line 27 further includes a cooling water flow control unit, for example, a four-way flow control valve 29, in the passenger compartment heating mode, bypassing the cooling water of the electric component module cooling device 30 to the battery B and returning the cooling water passed through the battery B back to the electric component module cooling device 30.

In the passenger compartment cooling mode, the battery cooling device 30 cools the battery B by using the refrigerant in the refrigerant circulation line 12 as shown in FIG. 3.

Particularly, the refrigerant in the refrigerant circulation line 12 is bypassed through the bypass flow path 22. The bypassed refrigerant is expanded and depressurized by the expansion valve 24. Then, the expanded/depressurized low-temperature refrigerant and the cooling water in the battery side cooling water circulation line 27 are caused to exchange heat in the chiller 25, thereby cooling the cooling water in the battery side cooling water circulation line 27. The battery B is cooled by causing the cooled cooling water to circulate through the battery B.

In the passenger compartment heating mode, as shown in FIG. 4, the battery B is cooled by using the cooling water of the electric component module cooling device 30.

In particular, the cooling water of the electric component module cooling device 30 is introduced into the battery side cooling water circulation line 27 through the flow control valve 29, and the introduced cooling water is introduced toward the battery B. Then, the battery B is cooled by the introduced cooling water. Thereafter, the cooling water which has cooled the battery B is returned to the electric component module cooling device 30 through the flow control valve 29.

Figure 5:
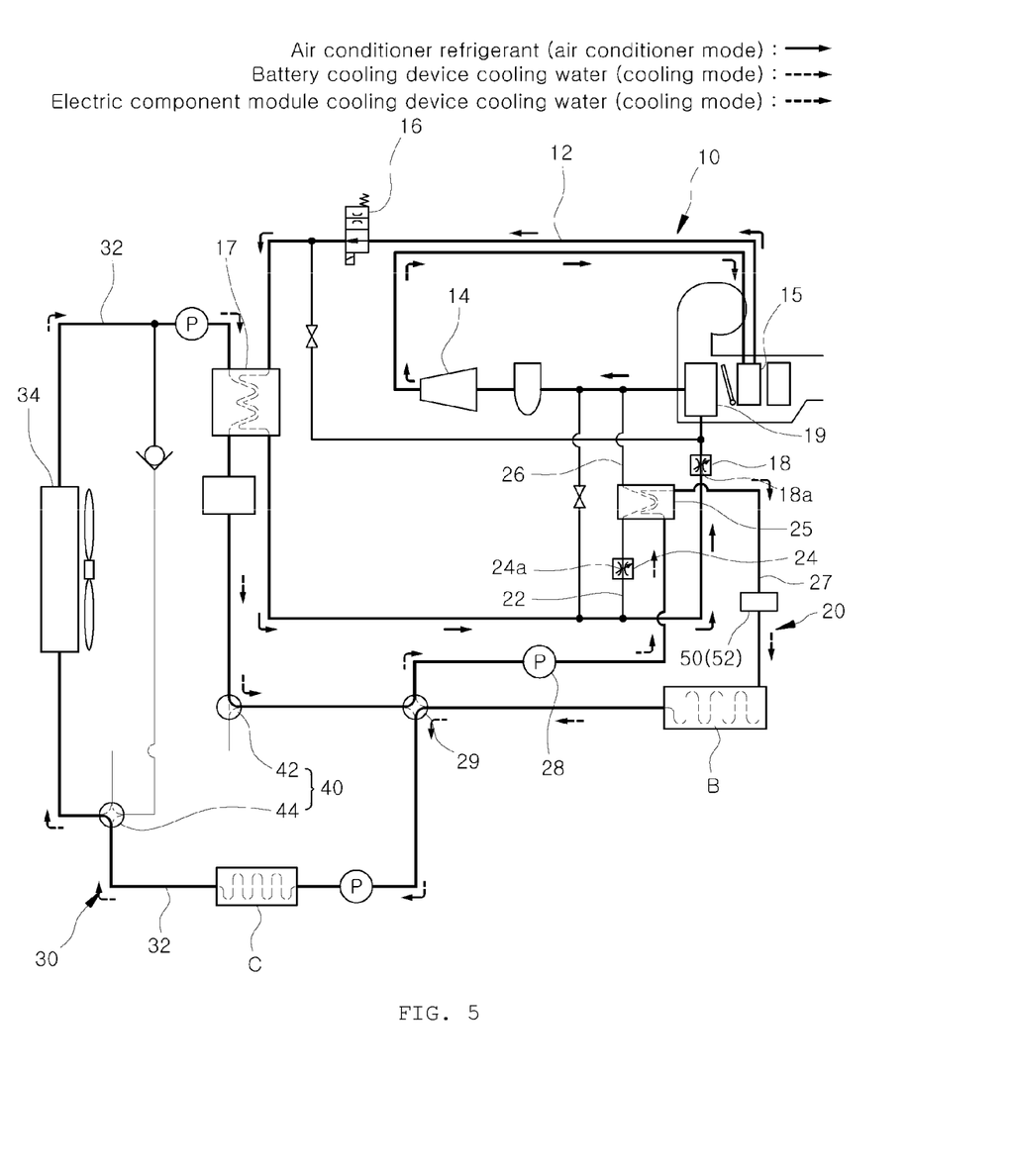
FIG. 5 is an operation view showing an operation example of the integrated heat management system according to the present invention, in which view there are shown operation examples of the air conditioner, the battery cooling device and the electric component module cooling device in the passenger compartment cooling mode.

Meanwhile, even in the passenger compartment heating mode, the battery cooling device 20 may cool the battery B using the cooling water of the electronic component module cooling device 30, as shown in FIG. 5.

That is, in the passenger compartment cooling mode, the cooling water of the electric component module cooling device 30 is introduced into the battery side cooling water circulation line 27 through the flow control valve 29, and the introduced cooling water is caused to flow toward the battery B. Then, the battery B is cooled by the introduced cooling water. Thereafter, the cooling water which has cooled the battery B is returned to the electric component module cooling device 30 through the flow control valve 29.

In the cooling mode, when the battery B is cooled by using the cooling water of the electronic component module cooling device 30 as described above, the cooling of the battery B by using the refrigerant of the air conditioner 10 is stopped.

In particular, the variable throttle flow path 24a of the expansion valve 24 is completely blocked to stop the operation of the chiller 25, thereby stopping the cooling of the battery B using the refrigerant of the air conditioner 20.

Referring again to FIG. 2, the electric component module cooling device 30 includes an electric component module side cooling water circulation line 32.

The electric component module side cooling water circulation line 32 connects the water-cooled outdoor heat exchanger 17 of the refrigerant circulation line 12, the electronic component module C and the radiator 34 to circulate the cooling water therebetween.

The electric component module side cooling water circulation line 32 includes a cooling water flow control unit 40 for causing at least one of the cooling water passing through the electronic component module C and the cooling water passing through the radiator 34 to circulate through the water-cooled outdoor heat exchanger 17 according to the mode state of the vehicle.

The cooling water flow control unit 40 includes a three-way flow control valve 42 installed between the downstream side of the water-cooled outdoor heat exchanger 17 and the upstream side of the electric component module C, and a four-way flow control valve 44 installed at a connection point between the downstream side of the three-way flow control valve 42, the downstream side of the electric component module C, the upstream side of the radiator 34 and the upstream side of the water-cooled outdoor heat exchanger 17.

In the passenger compartment cooling mode, as shown in FIG. 3, these flow control valves 42 and 44 bring the radiator 34 and the water-cooled outdoor heat exchanger 17 into communication with each other so that a cooling water circulation loop can be formed between the radiator 34 and the water-cooled outdoor heat exchanger 17.

Therefore, in the passenger compartment cooling mode, the cooling water is circulated between the radiator 34 and the water-cooled outdoor heat exchanger 17. This enables the cooling water cooled by the radiator 34 to cool the water-cooled outdoor heat exchanger 17 in the passenger compartment cooling mode.

In the passenger compartment cooling mode, the flow control valves 42 and 44 bring the electric component module C and the water-cooled outdoor heat exchanger 17 into communication with each other so that a cooling water circulation loop can be formed between the electric component module C and the water-cooled outdoor heat exchanger 17.

Therefore, in the passenger compartment cooling mode, the cooling water may be mixed with the cooling water of the radiator 34 while circulating between the electric component module C and the water-cooled outdoor heat exchanger 17. In this way, the cooling water that has absorbed the waste heat of the electronic component module C may be cooled by the heat exchange with the cooling water of the radiator 34.

In the passenger compartment heating mode, as shown in FIG. 4, the flow control valves 42 and 44 bring the electric component module C and the water-cooled outdoor heat exchanger 17 into communication with each other so that a cooling water circulation loop can be formed between the electric component module C and the water-cooled outdoor heat exchanger 17.

Therefore, in the passenger compartment heating mode, the cooling water is circulated between the electric component module C and the water-cooled outdoor heat exchanger 17. In this way, the cooling water that has absorbed the waste heat of the electronic component module C may exchange heat with the water-cooled outdoor heat exchanger 17 in the passenger compartment heating mode.

As a result, the waste heat of the electronic component module C is absorbed by the water-cooled outdoor heat exchanger 17. The waste heat thus absorbed prevents the icing phenomenon which may be generated in the water-cooled outdoor heat exchanger 17. The waste heat is absorbed by the refrigerant circulation line 12, thereby enhancing the heat pump mode efficiency of the refrigerant circulation line 12 and improving the passenger compartment heating performance.

In the passenger compartment heating mode, the flow control valves 42 and 44 cooperates with the battery side cooling water circulation line 27 to bring the electric component module side cooling water circulation line 32 and the battery side cooling water circulation line 27 into communication with each other. In particular, the electric component module C, the water-cooled outdoor heat exchanger and the battery B are brought into communication with each other.

Therefore, in the passenger compartment heating mode, a cooling water circulation loop may be formed between the electric component module C, the water-cooled outdoor heat exchanger 17 and the battery B.

This enables the cooling water to be circulated between the electric component module C, the water-cooled outdoor heat exchanger 17 and the battery B in the passenger compartment heating mode. As a result, in the passenger compartment heating mode, the cold air generated in the water-cooled outdoor heat exchanger 17 is transferred to the battery B and the electric component module C, thereby efficiently cool the battery B and the electric component module C.

In addition, in the passenger compartment heating mode, the flow control valves 42 and 44 bring the radiator 34 and the water-cooled outdoor heat exchanger 17 into communication with each other so that a cooling water circulation loop can be formed between the radiator 34 and the water-cooled outdoor heat exchanger 17.

Thus, in the passenger compartment heating mode, the cooling water may be mixed with the cooling water on the side of the electronic component module C while circulating between the radiator 34 and the water-cooled outdoor heat exchanger 17. Thus, the cooling water cooled by the radiator 34 may exchange heat with the cooling water on the side of the electronic component module C.

Referring to FIG. 5, in the passenger compartment cooling mode, the flow control valves 42, 44 and 29 of the cooling water flow control unit 40 bring the electric component module C, the radiator 34, the water-cooled outdoor heat exchanger 17 and the battery B of the battery side cooling water circulation line 27 into communication with each other.

Therefore, in the passenger compartment cooling mode, a cooling water circulation loop may be formed between the electric component module C, the radiator 34, the water-cooled outdoor heat exchanger 17 and the battery B.

This allows the cooling water to circulate between the electric component module C, the radiator 34, the water-cooled outdoor heat exchanger 17 and the battery B in the passenger compartment cooling mode. As a result, the cooling water that has absorbed the waste heat of the battery B and the electronic component module C is cooled while passing through the radiator 34. Then, the cooling water may circulate toward the water-cooled outdoor heat exchanger 17. This makes it possible to enhance the cooling efficiency for the battery B and the electric component module C.

Figure 6:
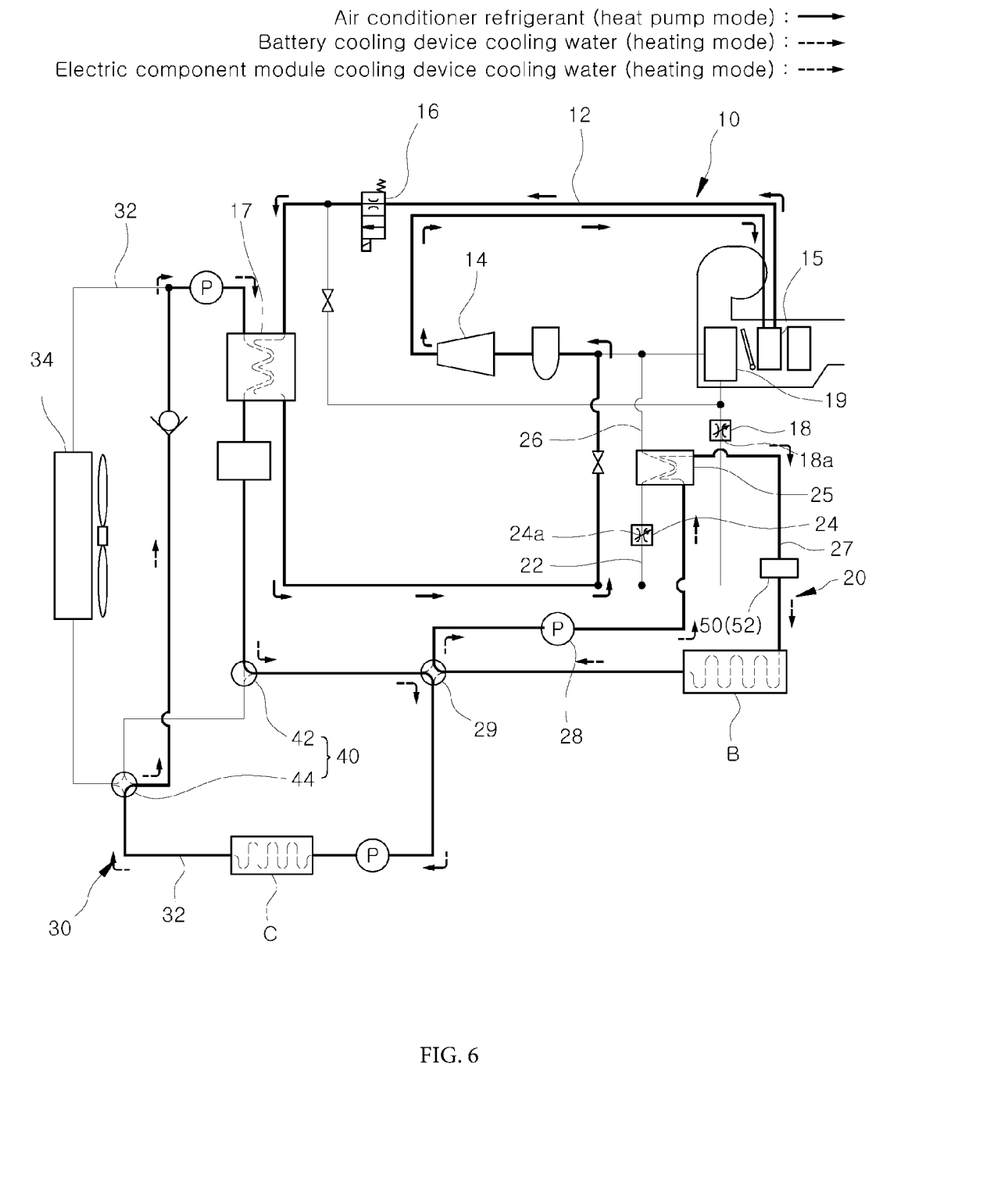
FIG. 6 is an operation view showing an operation example of the integrated heat management system according to the present invention, in which view there are shown operation examples of the air conditioner, the battery cooling device and the electric component module cooling device in a passenger compartment heating mode and a battery charging mode.

As shown in FIG. 6, when the passenger compartment heating mode and the battery charging mode are performed at the same time, the flow control valves 42, 44 and 29 of the cooling water flow control unit 40 bring only the electric component module C and the water-cooled outdoor heat exchanger 17 into communication with each other so that a cooling water circulation loop can be formed only between the electric component module C and the water-cooled outdoor heat exchanger 17.

Therefore, when simultaneously performing the passenger compartment heating mode and the battery charging mode, the cooling water is allowed to circulate only between the electric component module C and the water-cooled outdoor heat exchanger 17.

This allows the waste heat of the electric component module C and the cold air of the water-cooled outdoor heat exchanger 17 to exchange heat with each other when simultaneously performing the passenger compartment heating mode and the battery charging mode. As a result, it is possible to increase the temperature of the water-cooled outdoor heat exchanger 17 of the refrigerant circulation line 12 and to cool the electronic component module C.

Referring again to FIG. 2, the integrated heat management system according to the present invention further includes a battery preheater 50 for preheating the battery B when the battery B is charged.

The battery preheater 50 includes a PTC heater 52 provided on the battery side cooling water circulation line 27.

In the battery charging mode, the PTC heater 52 heats the cooling water flowing through the battery side cooling water circulation line 27 as shown in FIG. 6. Thus, the heated cooling water is introduced into the battery B to preheat the battery B. This enhances the charging efficiency when the battery B is charged.

According to the integrated heat management system of the present invention having such a structure, it is possible to significantly improve the connectivity between the air conditioner 10 and the electric component module cooling device 30 and the commonality of components, thereby reducing the number of components without causing a decrease in the performance of the air conditioner 10 and the electric component module cooling device 30.

In particular, the water-cooled outdoor heat exchanger of the air conditioner 10 is used as a refrigerant condenser in the cooling mode, and is used as a refrigerant evaporator in the heating mode. The water-cooled outdoor heat exchanger 17 of the air conditioner 10 is configured to exchange heat with the electric component module cooling device 30 in a water-cooled manner. As a result, when cold air is generated in the heating mode, the influence of the generated cold air can be alleviated by the cooling water of the electric component module cooling device 30. Therefore, it is possible to surely prevent the surface icing phenomenon which may be caused by the cold air.

Therefore, unlike the prior art (see FIG. 1), when the icing of the outdoor heat exchanger 1d occurs, it is not necessary to bypass the refrigerant on the upstream side of the outdoor heat exchanger 1d by the separate bypass valve 1g to prevent the icing of the outdoor heat exchanger 1d. Therefore, it is possible to prevent occurrence of an icing phenomenon on the surface of the outdoor heat exchanger 17 without adopting a separate bypass valve 1g. This makes it possible to reduce the number of components and to reduce a manufacturing cost.

Furthermore, the water-cooled outdoor heat exchanger 17 of the air conditioner 10 also plays a role of a waste heat recovery chiller that recovers the waste heat of the electric component module cooling device 30 in the heating mode. This enables the air conditioner 10 to absorb the waste heat of the battery B and the electric component module C without adopting a separate waste heat recovery chiller 7d, thereby reducing the number of components and consequently reducing a manufacturing cost.

Moreover, the water-cooled outdoor heat exchanger 17 of the air conditioner 10 is cooled while exchanging heat with the electric component module cooling device 30. Therefore, unlike the conventional outdoor heat exchanger 1d having an air-cooled structure (see FIG. 1), there is no need to install the water-cooled outdoor heat exchanger 17 of the air conditioner 10 in parallel with the radiator 34.

Accordingly, it is possible to broaden the installation space of the radiator 34 and to increase the size of the radiator 34, thereby increasing the cooling capacity of the radiator 34 and significantly improving the cooling performance of the electric component module cooling device 30, the battery cooling device 20 and the air conditioner 10.

Although the preferred embodiments of the present invention have been described above by way of example, the scope of the present invention is not limited to these specific embodiments, and may be appropriately changed within the scope of the claims.

What is claimed is:

1. An integrated heat management system for a vehicle, comprising:
    a refrigerant circulation line configured to cool or heat a passenger compartment while operating in an air conditioner mode or a heat pump mode according to a flow direction of a refrigerant;
    an electric component module side cooling water circulation line configured to circulate the cooling water through an electric component module to cool the electric component module, the electric component module side cooling water circulation line including a radiator for cooling the cooling water absorbing waste heat of the electric component module;
    a water-cooled outdoor heat exchanger configured to allow the refrigerant circulating through the refrigerant circulation line to exchange heat with the cooling water circulating through the electric component module side cooling water circulation line; and
    a cooling water flow control unit configured to control a cooling water flow in the electric component module side cooling water circulation line such that at least one of the cooling water absorbing the waste heat of the electric component module and the cooling water cooled by the radiator is caused to circulate through the water-cooled outdoor heat exchanger.

2. The system of claim 1, wherein the refrigerant circulation line includes a compressor, a high-pressure-side indoor heat exchanger, a heat pump mode expansion valve, an air conditioner mode expansion valve and a low-pressure-side indoor heat exchanger;
    the refrigerant circulation line is configured to, in a passenger compartment cooling mode, enter the air conditioner mode such that the refrigerant in the compressor passes through the air conditioner mode expansion valve to generate cold air in the low-pressure-side indoor heat exchanger on a downstream side, and in a passenger compartment heating mode, enter the heat pump mode such that the refrigerant in the compressor passes through the heat pump mode expansion valve to generate heat in the high-pressure-side indoor heat exchanger on an upstream side;
    the water-cooled outdoor heat exchanger is configured to, in the passenger compartment cooling mode, allow the refrigerant having a high temperature to exchange heat with the cooling water in the electric component module side cooling water circulation line; and
    the water-cooled outdoor heat exchanger is configured to, in the passenger compartment heating mode, allow the refrigerant having low temperature to exchange heat with the cooling water in the electric component module side cooling water circulation line.

3. The system of claim 2, wherein the cooling water flow control unit is configured to, in the passenger compartment cooling mode, allow the cooling water cooled by the radiator to circulate through the water-cooled outdoor heat exchanger such that the cooling water cooled by the radiator and the refrigerant having a high temperature in the refrigerant circulation line exchange heat with each other in the water-cooled outdoor heat exchanger, and in the passenger compartment heating mode, allow the cooling water absorbing the waste heat of the electric component module to circulate through the water-cooled outdoor heat exchanger such that the cooling water absorbing the waste heat of the electric component module and the refrigerant having a low temperature in the refrigerant circulation line exchange heat with each other in the water-cooled outdoor heat exchanger.

4. The system of claim 3, further comprising:
    a battery side cooling water circulation line configured to allow the cooling water to circulate through the battery to cool the battery,
    wherein the cooling water flow control unit is configured to, in the passenger compartment heating mode, allow the cooling water in the electric component module side cooling water circulation line to circulate through the battery side cooling water circulation line to cool the battery.

5. The system of claim 4, wherein the cooling water flow control unit is configured to, in the passenger compartment heating mode, allow the cooling water in the electric component module side cooling water circulation line to circulate through the battery side cooling water circulation line, and allow the cooling water in the electric component module side cooling water circulation line passing through the water-cooled outdoor heat exchanger to circulate through the battery side cooling water circulation line.

6. The system of claim 5, wherein the cooling water flow control unit is configured to, in the passenger compartment cooling mode, allow the cooling water in the electric component module side cooling water circulation line to optionally circulate through the battery side cooling water circulation line to cool the battery.

7. The system of claim 6, wherein the cooling water flow control unit is configured to, when causing the cooling water in the electric component module side cooling water circulation line to circulate through the battery of the battery side cooling water circulation line in the passenger compartment cooling mode, allow the cooling water circulating through the battery to sequentially pass through the electric component module and the radiator and then circulate through the water-cooled outdoor heat exchanger.

8. The system of claim 7, wherein the cooling water flow control unit is configured to, when the passenger compartment heating mode and the battery charging mode are performed at the same time, allow only the cooling water absorbing the waste heat of the electric component module to circulate through the water-cooled outdoor heat exchanger such that the cooling water absorbing the waste heat of the electric component module and the refrigerant having a low temperature in the refrigerant circulation line exchange heat with each other in the water-cooled outdoor heat exchanger.

9. The system of claim 3, wherein the cooling water flow control unit is configured to, in the passenger compartment cooling mode, allow the cooling water absorbing the waste heat of the electric component module to circulate through the water-cooled outdoor heat exchanger such that the cooling water absorbing the waste heat of the electric component module and the cooling water cooled by the radiator are mixed to exchange heat with each other in the water-cooled outdoor heat exchanger, and in the passenger compartment heating mode, allow the cooling water cooled by the radiator to circulate through the water-cooled outdoor heat exchanger such that the cooling water cooled by the radiator and the cooling water absorbing the waste heat of the electric component module are mixed to exchange heat with each other in the water-cooled outdoor heat exchanger.

10. The system of claim 1, wherein the cooling water flow control unit includes a first three-way flow control valve installed between the downstream side of the water-cooled outdoor heat exchanger and the upstream side of the electric component module, and a four-way flow control valve installed between the downstream side of the first three-way flow control valve, the downstream side of the electric component module, the upstream side of the radiator and the upstream side of the water-cooled outdoor heat exchanger; and the first three-way flow control valve and the four-way flow control valve are configured to, in a passenger compartment cooling mode, form a cooling water circulation loop including the radiator and the water-cooled outdoor heat exchanger such that the cooling water is circulated between the radiator and the water-cooled outdoor heat exchanger, and in a passenger compartment heating mode, form a cooling water circulation loop including the electric component module and the water-cooled outdoor heat exchanger such that the cooling water is circulated between the electric component module and the water-cooled outdoor heat exchanger.

11. The system of claim 10, wherein the first three-way flow control valve and the four-way flow control valve are configured to, in the passenger compartment cooling mode, form a cooling water circulation loop including the electric component module and the water-cooled outdoor heat exchanger such that the cooling water is circulated between the electric component module and the water-cooled outdoor heat exchanger, and in the passenger compartment heating mode, form a cooling water circulation loop including the radiator and the water-cooled outdoor heat exchanger such that the cooling water is circulated between the radiator and the water-cooled outdoor heat exchanger.

12. The system of claim 11, wherein the cooling water flow control unit includes a second three-way flow control valve installed between the downstream side of the first three-way flow control valve, the upstream side of the electric component module and the battery side cooling water circulation line; and the first three-way flow control valve, the four-way flow control valve and the second three-way flow control valve are configured to, in the passenger compartment heating mode, form a cooling water circulation loop including the electric component module, the water-cooled outdoor heat exchanger and the battery such that the cooling water is circulated between the electric component module, the water-cooled outdoor heat exchanger and the battery.

13. The system of claim 12, wherein the first three-way flow control valve, the four-way flow control valve and the second three-way flow control valve are configured to, in the passenger compartment cooling mode, form a cooling water circulation loop including the electric component module, the radiator, the water-cooled outdoor heat exchanger and the battery such that the cooling water is circulated between the electric component module, the radiator, the water-cooled outdoor heat exchanger and the battery.

14. The system of claim 13, wherein the first three-way flow control valve, the four-way flow control valve and the second three-way flow control valve are configured to, when the passenger compartment heating mode and the battery charging mode are performed at the same time, form a cooling water circulation loop including the electric component module and the water-cooled outdoor heat exchanger such that the cooling water is circulated between the electric component module and the water-cooled outdoor heat exchanger.

* * * * *